(12) United States Patent
Charagulla (10) Patent No.: US 7,490,209 B1
(45) Date of Patent: Feb. 10, 2009

(54) FULLY BUFFERED DIMM SYSTEM AND METHOD WITH HARD-IP MEMORY CONTROLLER AND SOFT-IP FREQUENCY CONTROLLER

(75) Inventor: Sanjay K. Charagulla, San Jose, CA (US)

(73) Assignee: Altera Corporation, San Jose, CA (US)

( * ) Notice: Subject to any disclaimer, the term of this patent is extended or adjusted under 35 U.S.C. 154(b) by 602 days.

(21) Appl. No.: 11/300,812

(22) Filed: Dec. 14, 2005

(51) Int. Cl.
*G06F 13/00* (2006.01)

(52) U.S. Cl. .......................... 711/167; 714/52; 714/758

(58) Field of Classification Search .................. 711/167; 714/52, 758
See application file for complete search history.

(56) References Cited

U.S. PATENT DOCUMENTS

| 5,619,581 A * | 4/1997 | Ferguson et al. .......... 381/71.12 |
| 2006/0215592 A1 * | 9/2006 | Tomoe et al. ............... 370/315 |

* cited by examiner

*Primary Examiner*—Reba I Elmore
(74) *Attorney, Agent, or Firm*—Townsend and Townsend and Crew LLP (57) ABSTRACT

A system and method for memory control. The system includes a hard-IP memory controller, a soft-IP frequency conversion system, and an interface system. The soft-IP frequency conversion system is coupled to the hard-IP memory controller, and is capable of being programmed to convert data signals between a first frequency and a second frequency.

26 Claims, 6 Drawing Sheets

*FIG. 6*

FULLY BUFFERED DIMM SYSTEM AND METHOD WITH HARD-IP MEMORY CONTROLLER AND SOFT-IP FREQUENCY CONTROLLER

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates generally to memory systems. More specifically, the invention provides a hard-IP memory controller and a soft-IP frequency converter. Merely by way of example, the invention has been applied to a fully buffered DIMM system and method, but it would be recognized that the invention has a much broader range of applicability.

The fully buffered DIMM technology often uses two signal interfaces between memory controller and memory chips. One interface is between the memory chips and a buffer, and the other interface is between the buffer and the memory controller. The buffer is often an advanced memory buffer (AMB). For example, the interface between the memory chips and the AMB can support the double data rate. In another example, the interface between the AMB and memory controller is a serial interface.

A conventional fully buffered DIMM memory system includes memory chips, advanced memory buffers, a memory controller, a physical media attachment (PMA) electrical interface and physical coding sub-layer (PCS), and a controller configuration system. These components can be implemented in field programmable gate arrays (FPGAs) to support high-throughput IP protocols. But the implementation often uses a large number of programmable logic elements, and therefore can be very expensive. As a result, users often port these components to application-specific integrated circuits (ASICs) in order to reduce system costs. But this cost reduction comes at the expense of programmability. Hence it is desirable to improve techniques for memory systems.

BRIEF SUMMARY OF THE INVENTION

The present invention relates generally to memory systems. More specifically, the invention provides a hard-IP memory controller and a soft-IP frequency converter. Merely by way of example, the invention has been applied to a fully buffered DIMM system and method, but it would be recognized that the invention has a much broader range of applicability.

An embodiment of the present invention provides a system for memory control. The system includes a hard-IP memory controller, a soft-IP frequency conversion system, and an interface system. The soft-IP frequency conversion system is coupled to the hard-IP memory controller, and is capable of being programmed to convert data signals between a first frequency and a second frequency.

Many benefits are achieved by way of the present invention over conventional techniques. For example, some embodiments of the present invention integrate a hard-IP fully buffered DIMM core into a FPGA. Certain embodiments of the present invention provide a solution for fully buffered DIMM technology. The solution can facilitate optimum die-area usage, high performance, cost reduction, power savings, and/or high programmability. For example, the solution helps maintain programmability offered by the Stratix GX Device Family. In another example, the solution can significantly lower the costs in comparison to implementing all components in FPGAs. Some embodiments of the present invention provide a frequency converter that can serve all three modes of data speeds of the fully buffered DIMM protocol. For example, the frequency converter transfers the data between memory controller frequency and physical interface frequency. In another example, the frequency converter is implemented with soft-IP blocks. Certain embodiments of the present invention provide a hybrid gate array (GA) solution. The solution implements some logic intensive and/or logic rich features as part of a hard-IP block. For example, the hard-IP features include the memory controller with CRC and ECC components. Other features are implemented as part of a soft-IP block. For example, the soft-IP features include the frequency converter for data synchronization and the configuration system for the memory controller.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates generally to memory systems. More specifically, the invention provides a hard-IP memory controller and a soft-IP frequency converter. Merely by way of example, the invention has been applied to a fully buffered DIMM system and method, but it would be recognized that the invention has a much broader range of applicability.

Figure 1:
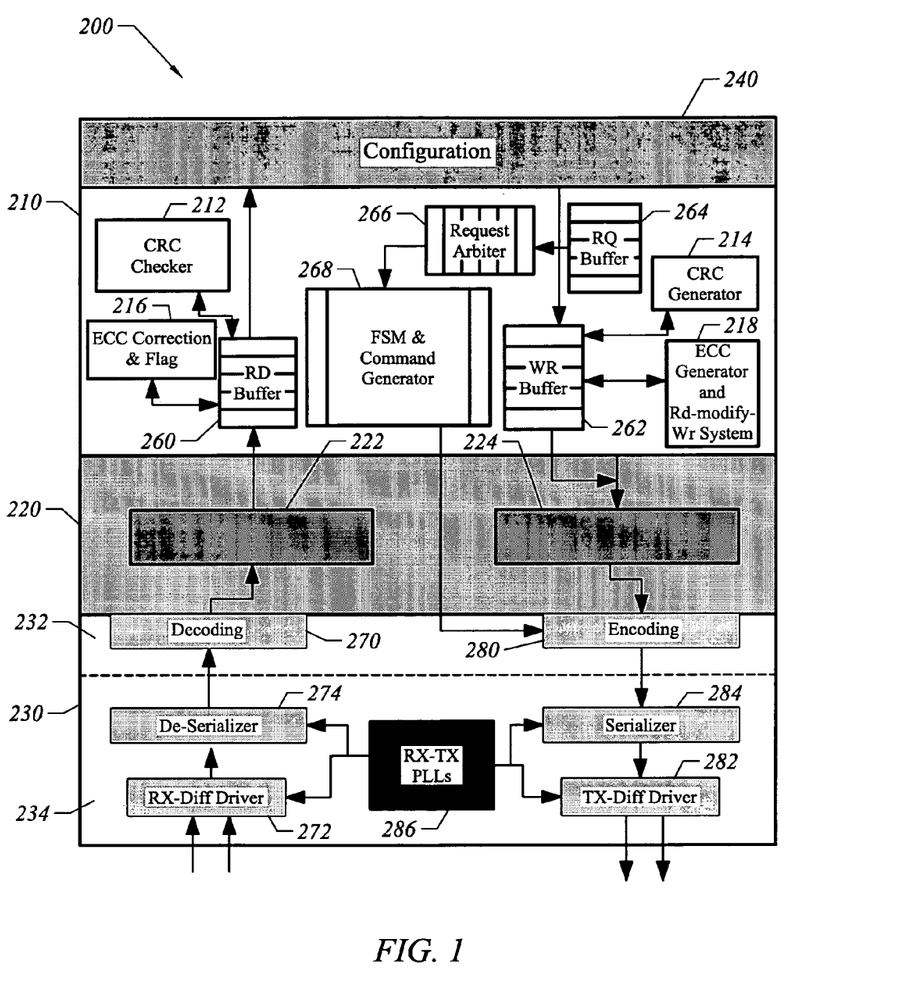
FIG. 1 is a simplified system for memory control according to an embodiment of the present invention.

FIG. 1 is a simplified system for memory control according to an embodiment of the present invention. This diagram is merely an example, which should not unduly limit the scope of the claims herein. The system 200 includes a hard-IP memory controller 210, a soft-IP frequency conversion system 220, an interface system 230, and a configuration system 240. Although the above has been shown using a selected group of components, there can be many alternatives, modifications, and variations. Depending upon the embodiment, the specific arrangements of components may be interchanged with others replaced. Further details of these components are found throughout the present specification and more particularly below.

The memory controller 210 is implemented as a hard-IP sub-system. For example, the connections between different components of the memory controller 210 are dedicated. In another example, the memory controller 210 is not field programmable. In yet another example, the memory controller 210 is not implemented by using a field programmable gate array (FPGA). In yet another example, the logic function of the memory controller 210 is determined by its physical layout. In one embodiment, the physical layout is realized by processing a semiconductor substrate in making the memory controller 210.

In another embodiment, the memory controller 210 includes a checker 212 for cyclic redundancy check (CRC), a CRC generator 214, a correction and flag system 216 for error correction code (ECC), an ECC generator and read-modify-write system 218, ECC generator 218, a reading buffer 260, a writing buffer 262, a request buffer 264, a request arbiter 266, and a finite-state-machine (FSM) and command generator 268. For this group of components, there can be many alternatives, modifications, and variations. Depending upon the embodiment, the specific arrangements of components may be interchanged with others replaced.

The reading buffer 260 receives data from the frequency conversion system 220. For example, these data have been read by using at least a receiver. In another example, the data are stored and outputted to the configuration system 240 on a first-in, first-out (FIFO) basis. In yet another example, the reading buffer 260 is also coupled to the CRC checker 212 and the ECC correction and flag system 216.

The writing buffer 262 receives data from the configuration system 240. For example, these data are to be written by using at least a transmitter. In another example, the data are stored and outputted to the frequency conversion system 220 on a FIFO basis. In yet another example, the writing buffer 262 is also coupled to the CRC generator 214 and the ECC generator and read-modify-write system 218.

In one embodiment, the CRC checker 212 is used for data path related to writing by transmitter, and the CRC generator 214 is used for data paths related to reading by receiver. For example, the transmitter and the receiver form a transceiver. In another embodiment, the ECC correction and flag system 216 is used for data path related to reading by the receiver, and the ECC generator and read-modify-write system 218 is used for data path related to writing by the transmitter. As an example, for each byte of data, two bits are verified. If there is one error, the error is fixed. If there is a plurality of errors, one error is fixed, but the other errors are flagged and forwarded to a central processing unit (CPU). In another example, the ECC algorithm is used to prevent and/or reduce data corruption at high speeds.

The request buffer 264 receives requests for writing and/or request for reading from the configuration system 240. For example, the requests for writing and/or the requests for reading are stored and outputted to the request arbiter 266 on a FIFO basis. The request arbiter 260 can provide arbitration among these requests for different bank interleaving. For example, the request arbiter uses a large number of logic components with various critical timing paths in order to serve multiple transmission channels. In another example, the request arbiter 266 sends instructions to the finite-state-machine (FSM) and command generator 268 as a result of arbitration. In response, the finite-state-machine (FSM) and command generator 268 generates commands to control writing operations and/or reading operations. For example, the commands are sent to the interface system 230.

The frequency conversion system 220 is implemented as a soft-IP sub-system. In one embodiment, the connections between different components of the frequency conversion system 220 are not dedicated. For example, the connections including polysilicon fuses can be programmed according to the user specifications. In another embodiment, the frequency conversion system 220 is field programmable. For example, the ratio of the input frequency to the output frequency is predetermined, but the frequency conversion system 220 can be programmed to receive frequencies of different magnitudes and outputs frequencies of different magnitudes respectively. In yet another embodiment, the frequency conversion system 220 is implemented by using one or more field programmable gate arrays (FPGAs). In yet another embodiment, the logic function of the frequency conversion system 220 is not entirely determined by its physical layout. For example, the physical layout is realized by processing a semiconductor substrate in making the frequency conversion system 220.

As shown in FIG. 1, the frequency conversion system 220 includes a frequency converter 222 for receiver and a frequency converter 224 for transmitter. The receiver and the transmitter form a transceiver. In one embodiment, the frequency converter 222 receives data at one frequency from the interface system 230, and outputs the data at another frequency to the memory controller 210. In another embodiment, the frequency converter 224 receives data at one frequency from the memory controller 210, and outputs the data at another frequency to the interface system 230.

According to one embodiment of the present invention, the frequency for data received from or outputted to the memory controller 210 is represented by $f_1$, and the frequency for data outputted to or received from the interface system 230 is represented by $f_2$. For example, the ratio of $f_1$ to $f_2$ is about 1.5. In another example, Table 1 shows various frequency conversions. $f_1$ of 133 MHz, 166 MHz, or 200 MHz corresponds to $f_2$ of 200 MHz, 250 MHz, or 300 MHz respectively.

TABLE 1

| Memory Controller | | | | Interface System | | |
|---|---|---|---|---|---|---|
| Bit Width | Frequency (MHz) | Data Rate (Gbps) | Conversion Ratio | Bit Width | Frequency (MHz) | Data Rate (Gbps) |
| 24 | 133 | 3.2 | 3:2 | 16 | 200 MHz | 3.2 |
| 24 | 166 | 4.0 | 3:2 | 16 | 250 MHz | 4.0 |
| 24 | 200 | 4.8 | 3:2 | 16 | 300 MHz | 4.8 |

According to another embodiment, the frequency conversion system 220 provides synchronization for data transfer between the memory controller 210 and the interface system 230. For example, the memory controller 210 and the interface system 230 are under different clock domains. The frequency conversion system 220 is implemented according to a predetermined frequency ratio. The latency on the data paths can be reduced or minimized. Additionally, the frequency conversion system 220 can be programmed to receive frequencies of different magnitudes and outputs frequencies of different magnitudes respectively, as shown in Table 1.

The interface system 230 is implemented as a hard-IP sub-system. For example, the connections between different components of the interface system 230 are dedicated. In another example, the interface system 230 is not field programmable. In yet another example, the interface system 230 is not implemented by using a field programmable gate array (FPGA). In yet another example, the logic function of the interface system 230 is determined by its physical layout. In one embodiment, the physical layout is realized by processing a semiconductor substrate in making the interface system 230.

In another embodiment, the interface system 230 includes a physical media attachment (PMA) electrical interface 232 and a physical coding sub-layer (PCS) 234. For example, the PMA electrical interface 232 includes a decoder 270 and an encoder 280. In another example, the physical coding sub-layer (PCS) 234 includes a receiver differential driver 272, a de-serializer 274, a transmitter differential driver 282, a serializer 284, and one or more phase-locked loops (PLLs) 286. For this group of components, there can be many alternatives, modifications, and variations. Depending upon the embodiment, the specific arrangements of components may be interchanged with others replaced.

As shown in FIG. 1, the PLLs 286 are used to generate clock signals that are sent to the receiver differential driver 272, the de-serializer 274, the transmitter differential driver 282, and the serializer 284. In one embodiment, some data are received by the receiver differential driver 272, and processed by the receiver differential driver 272, the de-serializer 274 and the decoder 270. The processed data are then sent to the frequency converter 222 for receiver. For example, the data are received by the receiver differential driver 272 from a memory buffer, such as an advanced memory buffer. In another embodiment, certain data are received by the encoder 280 from the frequency converter 224 for transmitter. These data are processed by the encoder 280, the serializer 284, and the transmitter differential driver 282. The processed data are outputted by the transmitter differential driver 282. For example, the transmitter differential driver 282 sends the processed data to a memory buffer, such as an advanced memory buffer.

The configuration system 240 is implemented as a soft-IP sub-system. In one embodiment, the connections between different components of the configuration system 240 are not dedicated. For example, the connections including polysilicon fuses can be programmed according to the user specifications. In another embodiment, the configuration system 240 is field programmable. In yet another embodiment, the configuration system 240 is implemented by using one or more field programmable gate arrays (FPGAs). In yet another embodiment, the logic function of the configuration system 240 is not entirely determined by its physical layout. For example, the physical layout is realized by processing a semiconductor substrate in making the configuration system 240.

As shown in FIG. 1, the configuration system 240 is coupled to the memory controller 210. In one embodiment, the configuration system 240 can dynamically configure the request generation and bank interleaving task for the memory controller 210. Status of different transmitter and receiver channels can be updated to the CPU. In another embodiment, the configuration system 240 includes register bits that can be programmed for various functions of the memory controller 210. For example, the register bits are used for setting memory modes. In yet another embodiment, the configuration system 240 includes one or more data registers. For example, each date register can provide 32 bits to each channel for reading or writing. In yet another embodiment, the configuration system 240 includes a configuration clock for reading and/or writing.

According to certain embodiments of the present invention, the memory controller 210 and the interface system 230 are implemented as part of a hard-IP block, and the frequency converter 220 and the configuration system 240 are implemented as part of a soft-IP block. There are various advantages for such implementations. For example, the frequency converter 220 is used to transfer data between different clock domains to meet the requirements of fully buffered DIMM protocol. Implementing the frequency converter 220 as part of the soft-IP block provides flexibility for various magnitudes of input frequencies and output frequencies. In another example, the interface system 230 is implemented as part of the hard-IP block to speed up generation of the header for the TLP packet. The header includes address, TLP type, transfer size, requester/completer ID, and traffic class.

Figure 2:
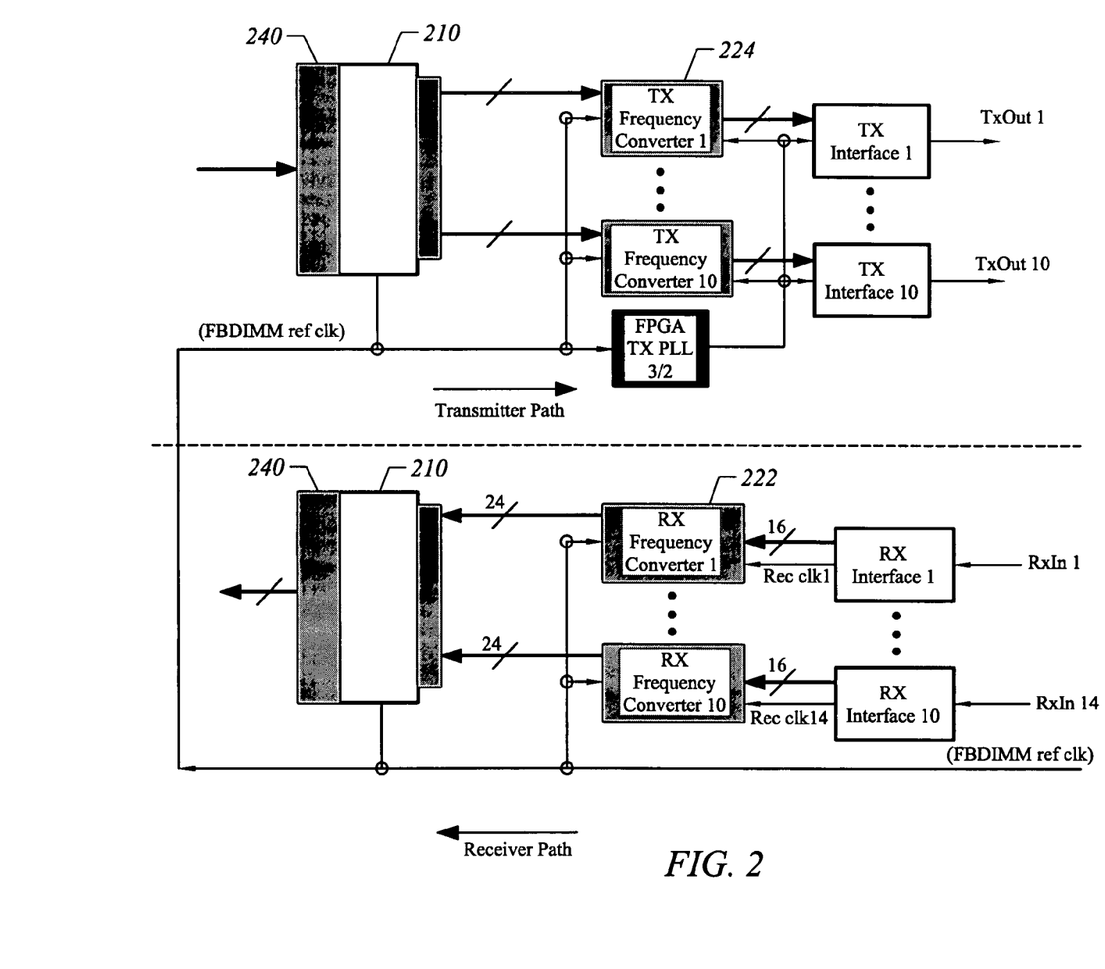
FIG. 2 is a simplified system for memory control according to another embodiment of the present invention.

FIG. 2 is a simplified system for memory control according to another embodiment of the present invention. This diagram is merely an example, which should not unduly limit the scope of the claims herein. The system 300 includes a hard-IP memory controller 310, a soft-IP frequency conversion system 320, an interface system 330, and a configuration system 340. Although the above has been shown using a selected group of components, there can be many alternatives, modifications, and variations. Depending upon the embodiment, the specific arrangements of components may be interchanged with others replaced. Further details of these components are found throughout the present specification and more particularly below.

In one embodiment, the system 300 is an example of the system 200. For example, the hard-IP memory controller 310, the soft-IP frequency conversion system 320, the interface system 330, and the configuration system 340 are the same as the hard-IP memory controller 210, the soft-IP frequency conversion system 220, the interface system 230, and the configuration system 240 respectively. In another example, the system 300 includes multiple transmitter paths and multiple receiver paths. Each transmitter path supports a transmitter channel, and each receiver path supports a receiver path. For example, the system 300 supports 10 transmitter channels and 14 receiver channels.

As shown in FIG. 2, one transmitter path includes the frequency converter 224 for transmitter, the encoder 280, the serializer 284, and the transmitter differential driver 282. For example, the encoder 280, the serializer 284, and the transmitter differential driver 282 form a transmitter interface. In another example, other transmitter paths each include components that are similar to the frequency converter 224 for transmitter, the encoder 280, the serializer 284, and the transmitter differential driver 282 respectively.

One receiver path includes the frequency converter 222 for receiver, the decoder 270, the de-serializer 274, and the receiver differential driver 272. For example, the decoder 270, the de-serializer 274, and the receiver differential driver 272 form a receiver interface. In another example, other receiver paths each include components that are similar to the frequency converter 222 for receiver, the decoder 270, the de-serializer 274, and the receiver differential driver 272.

Figure 3:
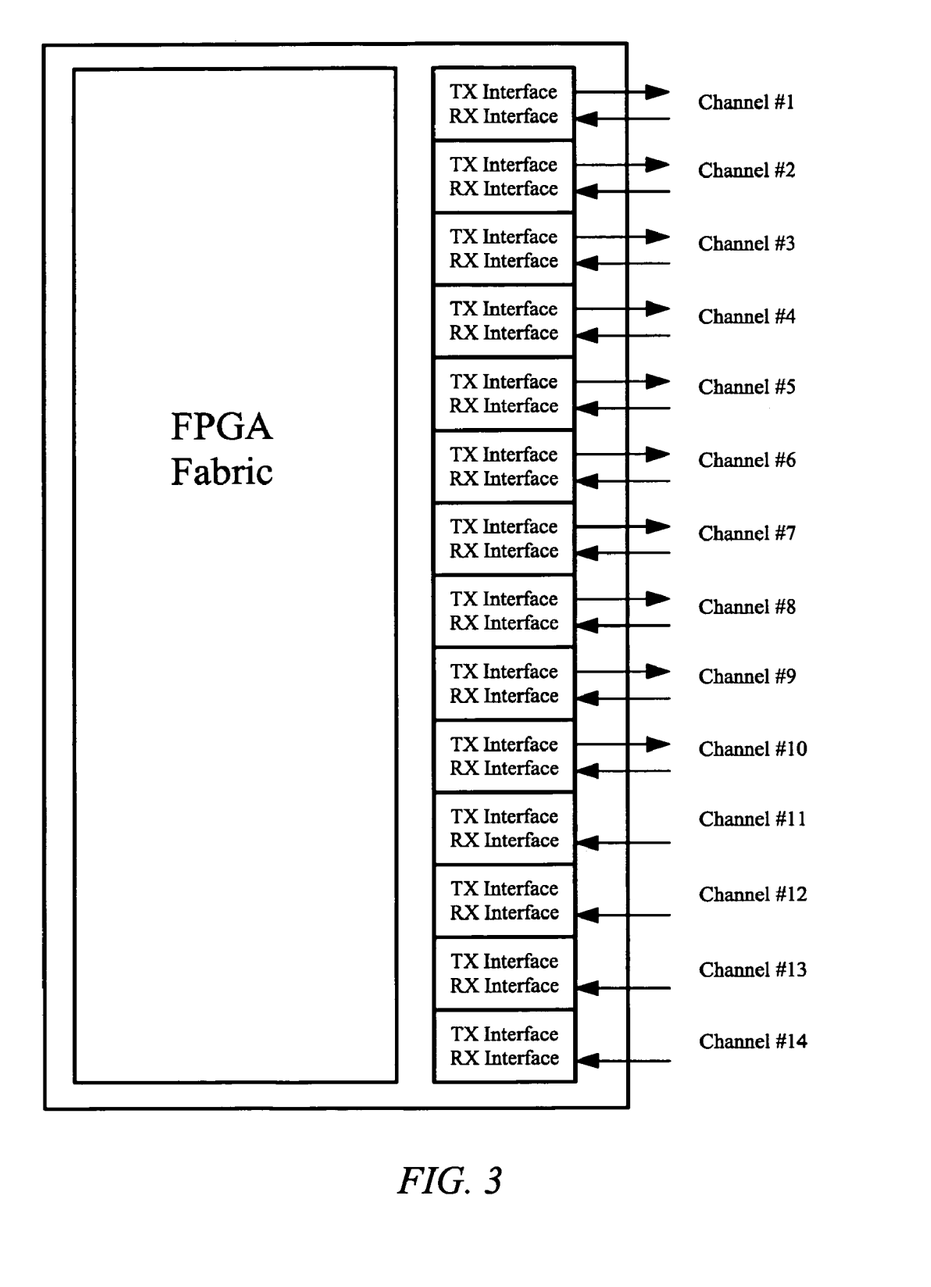
FIG. 3 is a simplified system for memory control according to yet another embodiment of the present invention.

FIG. 3 is a simplified system for memory control according to yet another embodiment of the present invention. This diagram is merely an example, which should not unduly limit the scope of the claims herein. For example, the system 400 is implemented according to the system 300.

According to some embodiments of the present invention, the interface system 230 and/or the interface system 330 is implemented based on Stratix GX Device Family currently sold by Altera Corp. of San Jose, Calif. For example, the interface system 230 includes 14 transceivers for 10 output channels and 14 input channels. In another example, the electrical specifications for Stratix GX Device Family are compatible with, even if not fully compliant to, the electrical specifications for fully buffered DIMM technology with some workarounds and limitations allowed by the users.

Table 2 shows an exemplary comparison between electrical specifications for Stratix GX Device Family and electrical specifications for fully buffered DIMM technology. As an example, the Stratix GX Device Family includes a physical media attachment (PMA) electrical interface that can perform parallel 10-bit to serial 1-bit conversion with PLL generated clocks and transmit the data with differential drivers. In another example, the physical media attachment (PMA) electrical interface can receive the data with differential drivers and perform serial 1-bit to parallel 10-bit conversion. In yet another example, the electrical specifications for fully buffered DIMM technology includes data rates at 3.2, 4.0, and 4.8 Gbps per single lane and per direction that can be up to 10 paths for transmitters and 14 paths for receivers. In contrast, the Stratix GX Device Family can support up to 32 full duplex paths for transmitters and receivers using embedded transceivers in the devices.

TABLE 2

| Features | Fully Buffered DIMM | Stratix II GX |
| --- | --- | --- |
| Data Rate | 3.2, 4.0, 4.8 Gbps | Up to 6.5 Gbps |
| DC Coupled (common mode), Rx $V_{cm}$ | 0.12–0.4 V | ~0.9 V |
| ESD | 2000V HBM | >1000V HBM |
| Lane Scalability | Up to ×14 | Up to ×24 |
| Bit run length | 512 bits | 128 bits |
| Serialization/De-serialization | 6 bits | 8 bits |

Figure 4:
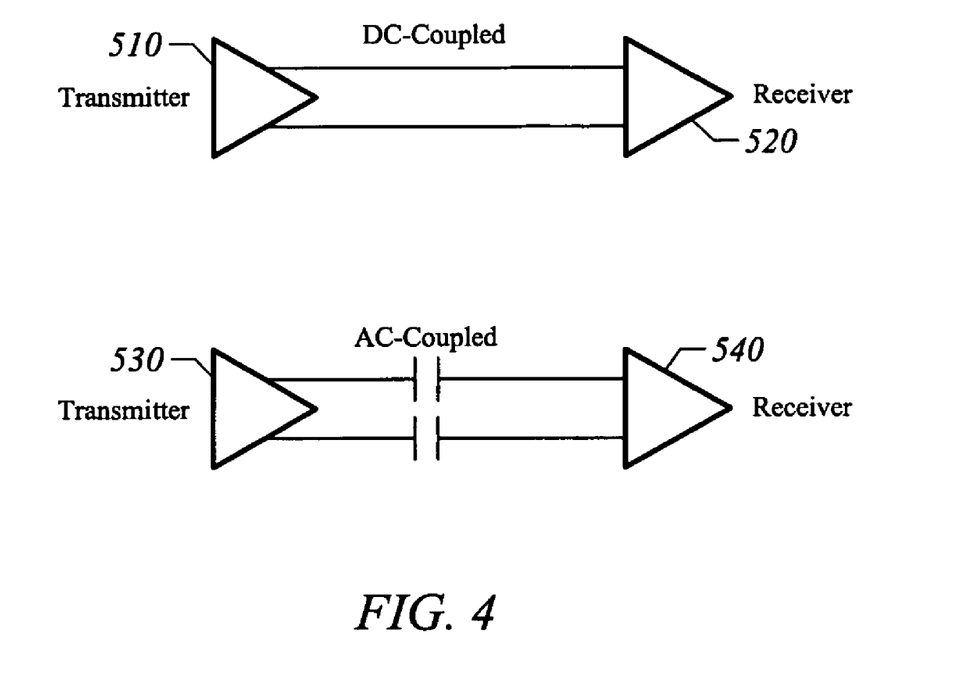
FIG. 4 is a simplified coupling between transmitter and receiver used for system for memory control according to an embodiment of the present invention.

FIG. 4 is a simplified coupling between transmitter and receiver used for system for memory control according to an embodiment of the present invention. This diagram is merely an example, which should not unduly limit the scope of the claims herein. For example, the system for memory control is the system 200. As shown in FIG. 4, a transmitter 510 sends some data to a receiver 520 for a memory buffer. For example, the transmitter includes the transmitter differential driver 282. In another example, the memory buffer is an advanced memory buffer. The transmitter 510 and the receiver 520 are DC-coupled. For example, the transmitter 510 and the receiver 520 use the same reference clock signal. Additionally, a receiver 530 receives certain data from a transmitter 540 for a memory buffer. For example, the receiver 530 includes the receiver differential driver 272. In another example, the memory buffer is an advanced memory buffer. The receiver 530 and the transmitter 540 are AC-coupled. For example, the receiver 530 and the transmitter 540 use different reference clock signals.

According to another embodiment of the present invention, a system for memory control includes a hard-IP memory controller, a soft-IP frequency conversion system coupled to the hard-IP memory controller, and an interface system coupled to at least the soft-IP frequency conversion system. The interface system includes a physical media attachment electrical interface and a physical coding sub-layer. The soft-IP frequency conversion system is capable of being programmed to convert data signals between a first frequency and a second frequency. The hard-IP memory controller includes a first plurality of devices associated with cyclic redundancy check and a second plurality of devices associated with error correction code.

According to yet another embodiment of the present invention, a system for memory control includes a hard-IP memory controller, a soft-IP frequency conversion system coupled to the hard-IP memory controller, and an interface system coupled to at least the soft-IP frequency conversion system. The interface system includes a physical media attachment electrical interface and a physical coding sub-layer. The hard-IP memory controller is capable of providing first instructions to the interface system, receiving first data from the interface system, and sending second data to the interface system. The soft-IP frequency conversion system is capable of being programmed to convert data signals between a first frequency and a second frequency, the first frequency being anyone of a plurality of frequencies.

According to yet another embodiment of the present invention, a system for memory control includes a hard-IP memory controller, a soft-IP frequency conversion system coupled to the hard-IP memory controller, and an interface system coupled to at least the soft-IP frequency conversion system. The interface system is capable of transmitting first data to a memory buffer and receiving second data from the memory buffer. The hard-IP memory controller is capable of providing instructions to the interface system, sending the first data to the interface system, and receiving the second data from the interface system. The soft-IP frequency conversion system is capable of being programmed to convert data signals between a first frequency and a second frequency.

Figure 5:
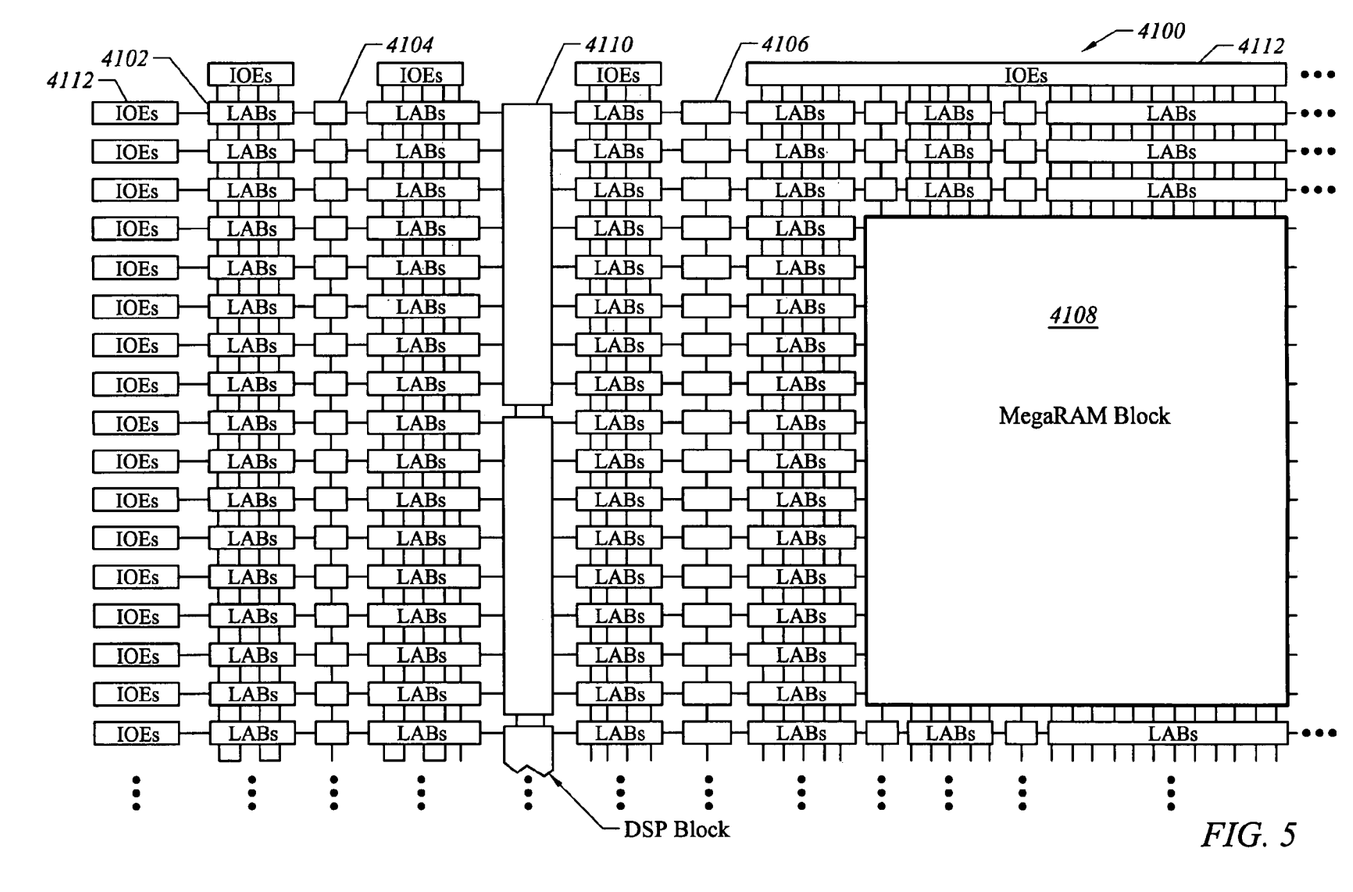
FIG. 5 is a simplified partial block diagram of an exemplary high-density programmable logic device.

The present invention has various applications. Certain embodiments of the present invention provide systems for memory control to integrated circuit systems. For example, some embodiments of the present invention provide systems for memory control to programmable logic devices. FIG. 5 is a simplified partial block diagram of an exemplary high-density programmable logic device (PLD) 4100 wherein techniques according to the present invention can be utilized. The PLD 4100 includes a two-dimensional array of programmable logic array blocks (LABs) 4102 that are interconnected by a network of column and row interconnections of varying length and speed. The LABs 4102 include multiple (e.g., 10) logic elements (LEs), an LE being a small unit of logic that provides for efficient implementation of user defined logic functions.

The PLD 4100 also includes a distributed memory structure including RAM blocks of varying sizes provided throughout the array. The RAM blocks include, for example, 512 bit blocks 4104, 4K blocks 4106 and an M-Block 4108 providing 512K bits of RAM. These memory blocks may also include shift registers and FIFO buffers. The PLD 4100 further includes digital signal processing (DSP) blocks 4110 that can implement, for example, multipliers with add or subtract features.

It is to be understood that the PLD 4100 is described herein for illustrative purposes only and that the present invention can be implemented in many different types of PLDs, FPGAs, and the other types of digital integrated circuits.

Figure 6:
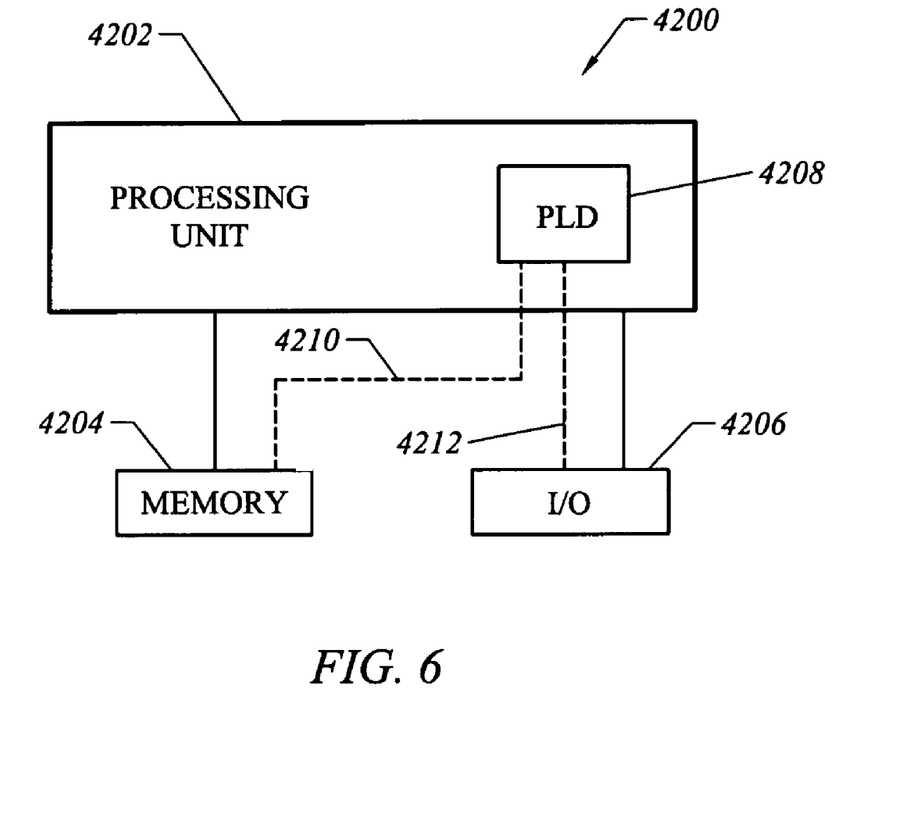
FIG. 6 shows a block diagram of an exemplary digital system.

While the PLDs of the type shown in FIG. 5 provide many of the resources required to implement system level solutions, the present invention can also benefit systems wherein a PLD is one of several components. FIG. 6 shows a block diagram of an exemplary digital system 4200, within which the present invention may be embodied. The system 4200 can be a programmed digital computer system, digital signal processing system, specialized digital switching network, or other processing system. Moreover, such systems may be designed for a wide variety of applications such as telecommunications systems, automotive systems, control systems, consumer electronics, personal computers, Internet communications and networking, and others. Further, the system 4200 may be provided on a single board, on multiple boards, or within multiple enclosures.

The system 4200 includes a processing unit 4202, a memory unit 4204 and an I/O unit 4206 interconnected together by one or more buses. According to this exemplary embodiment, a programmable logic device (PLD) 4208 is embedded in the processing unit 4202. The PLD 4208 may serve many different purposes within the system in FIG. 6. The PLD 4208 can, for example, be a logical building block of the processing unit 4202, supporting its internal and external operations. The PLD 4208 is programmed to implement the logical functions necessary to carry on its particular role in system operation. The PLD 4208 may be specially coupled to the memory unit 4204 through connection 4210 and to the I/O unit 4206 through connection 4212.

The processing unit 4202 may direct data to an appropriate system component for processing or storage, execute a program stored in the memory 4204 or receive and transmit data via the I/O unit 4206, or other similar function. The processing unit 4202 can include a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more of the PLD 4208 can control the logical operations of the system. In an embodiment, the PLD 4208 acts as a reconfigurable processor, which can be reprogrammed as needed to handle a particular computing task. Alternately, the programmable logic device 4208 may itself include an embedded microprocessor. The memory unit 4204 may be a random access memory (RAM), read only memory (ROM), fixed or flexible disk media, PC Card flash disk memory, tape, or any other storage means, or any combination of these storage means.

The present invention has various advantages. Some embodiments of the present invention integrate a hard-IP fully buffered DIMM core into a FPGA. Certain embodiments of the present invention provide a solution for fully buffered DIMM technology. The solution can facilitate optimum die-area usage, high performance, cost reduction, power savings, and/or high programmability. For example, the solution helps maintain programmability offered by the Stratix GX Device Family. In another example, the solution can significantly lower the costs in comparison to implementing all components in FPGAs. Some embodiments of the present invention provide a frequency converter that can serve all three modes of data speeds of the fully buffered DIMM protocol. For example, the frequency converter transfers the data between memory controller frequency and physical interface frequency. In another example, the frequency converter is implemented with soft-IP blocks. Certain embodiments of the present invention provide a hybrid gate array (GA) solution. The solution implements some logic intensive and/or logic rich features as part of a hard-IP block. For example, the hard-IP features include the memory controller with CRC and ECC components. Other features are implemented as part of a soft-IP block. For example, the soft-IP features include the frequency converter for data synchronization and the configuration system for the memory controller.

Table 3 is a comparison between the soft-IP implementation and the hybrid implementation according to an embodiment of the present invention. The table is merely an example, which should not unduly limit the scope of the claims herein. The soft-IP (SIP) implementation of a fully buffered DIMM solution often consumes a high number of LEs. For example, a 14-path solution needs up to 75,000 SIP LEs as well as 64 M4K blocks of embedded memory. The hybrid implementation of a fully buffered DIMM solution, such as one used by the system 200, 300, and/or 400, can significantly reduce the overall LE consumption to 15,000 SIP LEs. On the other hand, the SIP LEs that are lost as a result of implementing the hard-IP (HIP) block must also be accounted for. For example, a 10,000 HIP LE solution on 90-nm technology uses approximately 1 mm² which translates into approximately 1,000 SIP LEs. As shown in Table 3, the total HIP block would takes about 60,000 HIP LEs and therefore 6 mm² is utilized, which converts to a die size for 6,000 SIP LEs. As can be seen, the hybrid solution results in significant die size and thus cost savings.

TABLE 3

| | SIP LE Used | Equivalent SIP LE Lost | Total Equivalent SIP LE Used | Die Size Savings (mm²) | M4K Blocks |
|---|---|---|---|---|---|
| Soft-IP Implementation | 75,000 | 0 | 75,000 | 0 | 64 |
| Hybrid Implementation | 15,000 | 6,000 | 21,000 | 50 | 64 |

It is understood the examples and embodiments described herein are for illustrative purposes only and that various modifications or changes in light thereof will be suggested to persons skilled in the art and are to be included within the spirit and purview of this application and scope of the appended claims.

What is claimed is:

1. A system for memory control, the system comprising:
a hard-IP memory controller;
a soft-IP frequency conversion system coupled to the hard-IP memory controller;
an interface system coupled to at least the soft-IP frequency conversion system;
wherein the interface system includes a physical media attachment electrical interface and a physical coding sub-layer;
wherein the soft-IP frequency conversion system is capable of being programmed to convert data signals between a first frequency and a second frequency;
wherein the hard-IP memory controller includes a first plurality of devices associated with cyclic redundancy check and a second plurality of devices associated with error correction code.

2. The system of claim 1 wherein the soft-IP frequency conversion system includes one or more field programmable gate arrays.

3. The system of claim 1 wherein the first frequency and the second frequency are associated with a predetermined ratio.

4. The system of claim 1 wherein the soft-IP frequency conversion system is programmed for selecting anyone of a plurality of frequencies as the first frequency.

5. The system of claim 1 wherein:
the soft-IP frequency conversion system includes a first frequency converter and a second frequency converter;
the first frequency converter is capable of being programmed to convert a first data signal from the first frequency to the second frequency;

the second frequency converter is capable of being programmed to convert a second data signal from the second frequency to the first frequency.

6. The system of claim 1 wherein the hard-IP memory controller does not include a field programmable gate array.

7. The system of claim 1 wherein the hard-IP memory controller is capable of providing instructions to the interface system.

8. The system of claim 1 wherein the hard-IP memory controller further comprises at least one data buffer and at least one request buffer.

9. The system of claim 1, and further comprising a configuration system coupled to the hard-IP memory controller.

10. The system of claim 9 wherein the configuration system is a soft-IP system.

11. The system of claim 9 wherein the configuration system is capable to send instructions to the hard-IP memory controller.

12. The system of claim 1 wherein the interface system is a hard-IP system.

13. The system of claim 1 wherein the interface system is capable of transmitting first data to a memory buffer and receiving second data from the memory buffer.

14. A system for memory control, the system comprising:
a hard-IP memory controller;
a soft-IP frequency conversion system coupled to the hard-IP memory controller;
an interface system coupled to at least the soft-IP frequency conversion system;
wherein the interface system includes a physical media attachment electrical interface and a physical coding sub-layer;
wherein the hard-IP memory controller is capable of providing first instructions to the interface system, receiving first data from the interface system, and sending second data to the interface system;
wherein the soft-IP frequency conversion system is capable of being programmed to convert data signals between a first frequency and a second frequency, the first frequency being anyone of a plurality of frequencies.

15. The system of claim 14 wherein the soft-IP frequency conversion system includes one or more field programmable gate arrays.

16. The system of claim 14 wherein the first frequency and the second frequency are associated with a predetermined ratio.

17. The system of claim 14 wherein:
the soft-IP frequency conversion system includes a first frequency converter and a second frequency converter;
the first frequency converter is capable of being programmed to convert a first data signal from the first frequency to the second frequency;
the second frequency converter is capable of being programmed to convert a second data signal from the second frequency to the first frequency.

18. The system of claim 14 wherein the hard-IP memory controller does not include a field programmable gate array.

19. The system of claim 14 wherein the hard-IP memory controller includes a first plurality of devices associated with cyclic redundancy check and a second plurality of devices associated with error correction code.

20. The system of claim 14 wherein the hard-IP memory controller further comprises at least one data buffer and at least one request buffer.

21. The system of claim 14 wherein the interface system is a hard-IP system.

22. The system of claim 14 wherein the interface system is capable of receiving the first data from a memory buffer and transmitting the second data to the memory buffer.

23. A system for memory control, the system comprising:
a hard-IP memory controller;
a soft-IP frequency conversion system coupled to the hard-IP memory controller;
an interface system coupled to at least the soft-IP frequency conversion system;
wherein the interface system is capable of transmitting first data to a memory buffer and receiving second data from the memory buffer;
wherein the hard-IP memory controller is capable of providing instructions to the interface system, sending the first data to the interface system, and receiving the second data from the interface system;
wherein the soft-IP frequency conversion system is capable of being programmed to convert data signals between a first frequency and a second frequency.

24. The system of claim 23 wherein the first frequency is anyone of a plurality of frequencies.

25. The system of claim 23 wherein the data signals are associated with the first data.

26. The system of claim 23 wherein the data signals are associated with the second data.

* * * * *